… ……

United States Patent [19]

McGilvery

[11] 4,188,367
[45] Feb. 12, 1980

[54] MANUFACTURE OF RED PHOSPHORUS

[75] Inventor: James D. McGilvery, Etobicoke, Canada

[73] Assignee: Erco Industries Limited, Islington, Canada

[21] Appl. No.: 873,870

[22] Filed: Jan. 31, 1978

[30] Foreign Application Priority Data

Feb. 7, 1977 [GB] United Kingdom ............... 4895/77

[51] Int. Cl.$^2$ .......................................... C01B 25/023
[52] U.S. Cl. .................................................. 423/322
[58] Field of Search ............................. 423/322, 323

[56]  References Cited
U.S. PATENT DOCUMENTS

| 2,397,951 | 4/1946 | DeWitt | 423/322 |
| 2,476,335 | 7/1949 | Tusson | 423/322 |
| 3,207,583 | 9/1965 | Brautigam et al. | 423/322 |
| 3,998,931 | 12/1976 | Hyman et al. | 423/322 |

FOREIGN PATENT DOCUMENTS 135473  5/1960  U.S.S.R. ................................. 423/322

OTHER PUBLICATIONS

Van Wazer, Phosphorus and its Compounds, 1958, pp. 101–102, 112–118.

Primary Examiner—O. R. Vertiz
Assistant Examiner—Thomas W. Roy
Attorney, Agent, or Firm—Sim & McBurney

[57]  ABSTRACT

Particulate red phosphorus is obtained by thermal conversion of white phosphorus in an essentially dry process in which liquid white phosphorus is injected onto a bed of red phosphorus particles preheated to a temperature above the thermal conversion temperature while controlling the heat generation.

4 Claims, 2 Drawing Figures

MANUFACTURE OF RED PHOSPHORUS

FIELD OF INVENTION

This invention relates to the production of red phosphorus by thermal conversion of white phosphorus.

BACKGROUND TO THE INVENTION

Red phosphorus is known to be produced from white phosphorus by thermal conversion on an industrial scale in batch procedures. In one commercial procedure, white phosphorus is heated in a substantially inert atmosphere above the red phosphorus transition temperature in an enclosed container. After completion of the reaction, the mass of red phosphorus product is removed from the container by disintegration.

This commercial procedure has many drawbacks, mainly of an environmental nature, which arise from incomplete conversion of white phosphorus to red phosphorus and the nature of the process. For example, toxic white phosphorus fumes may be emitted on opening the container; removal of the residual white phosphorus from the red phosphorus, typically by addition of soda ash followed by leaching, produces a phosphate solution which requires disposal, and the disintegration of the red phosphorus product for removal from the reactor by chipping leads to dust formation and hazards to operators.

Another commercial procedure involves heating white phosphorus in an inert atmosphere in a ball mill at about 250° C. to convert approximately half of the white phosphorus to red phosphorus. After this initial conversion, the conversion is allowed to proceed to completion at a temperature in excess of about 340° C. No positive temperature control is applied during this conversion and only the heat capacity of the system limits the temperature rise. Operation of the ball mill during the conversion results in the formation of finely divided red phosphorus.

The latter procedure suffers from the disadvantage of lack of control of the extent of heat generation in the second stage, which may lead to an uncontrollable temperature rise. Additionally, equipment and installation costs are very high.

While these commercial batch systems suffer from drawbacks, the drawbacks are tolerated for the lack of a commercially viable alternative. Similarly, batch systems are used for the lack of a commercially viable continuous process.

The process for the production of red phosphorus by the thermal conversion of white phosphorus is an exothermic one. The rate of conversion increases rapidly with increasing temperature above about 300° C., so that the heat evolved may cause an uncontrolled reaction which may ultimately lead to phosphorus vapor explosions at high temperatures. In providing a safe, efficient process for the production of red phosphorus, care must be taken to control the heating of the system caused by the exothermic reaction.

SUMMARY OF INVENTION

The present invention provides such a process. In the present invention, the heat generated by the exothermic reaction is controlled. The heat generation control is achieved at least in part by limiting the quantity of white phosphorus converting at any one time. The process preferably is carried out continuously and results directly in particulate red phosphorus.

GENERAL DESCRIPTION OF INVENTION

The process of the invention involves injecting liquid white phosphorus, preferably anhydrous, into a closed pressure vessel containing a bed of finely divided red phosphorus particles, preferably of particle size of about $20\mu$ to about $5000\mu$, which is initially heated above the conversion temperature of white phosphorus to red phosphorus. The liquid white phosphorus preferably is injected into the vessel by spraying.

The heat generated by the exotherm is controlled at least in part by limiting the proportion of white phosphorus to red phosphorus within the container to provide an essentially dry process.

In referring to the procedure adopted to this invention as an "essentially dry" process, we mean that the conversion process occurs in a system in which the predominant phase is solid red phosphorus particles. The liquid white phosphorus which contacts the bed of solid particles is present in insufficient quantity to form a continuous phase.

The use of an essentially dry conversion process in accordance with this invention contracts markedly with other systems where a slurry of liquid white phosphorus and red phosphorus particles is reacted, for example, as described in U.S. Pat. No. 3,998,931. By maintaining a predominant phase of red phosphorus particles in accordance with this invention, the heat generation which occurs as a result of the thermal conversion is less and temperature rises are more readily controlled.

The process of the invention is susceptible of continuous operation wherein liquid white phosphorus is continuously injected into the reaction chamber containing the bed of red phosphorus particles and red phosphorus particles are removed from the reactor. The heat control may be achieved by limiting the steady state concentration of white phosphorus in the bed of red phosphorus particles to a value below about 20% by weight, preferably below about 5% by weight.

The extent to which heat control may be achieved by limiting the relative proportions of white and red phosphorus in the reactor bed depends on a number of factors. It may be desirable to augment the heat generation control by providing some heat exchange with the reactor bed, especially where the process of the invention is carried out continuously, as described in more detail below.

The conversion reaction is carried out at a temperature of about 300° to about 595° C. in the pressure range of about 15 to about 600 psi. The temperature control which is effected in the process of the invention is used to maintain the temperature within a fairly narrow temperature spread which preferably is within the range of about 350° to about 425° C.

The process of the invention preferably is effected in a continuous manner by continuously injecting liquid white phosphorus onto the bed of red phosphorus particles in the closed reaction vessel and removing red phosphorus product from the closed reaction vessel on a continuous or intermittent basis to control the quantity of phosphorus present in the reaction vessel. Unreacted white phosphorus is removed from the product and the substantially pure red phosphorus particles recovered.

In such a continuous process, it is preferred to maintain a steady state concentration of white phosphorus in the particle bed below about 20% by weight and more preferably below about 5% by weight and utilize such concentration control at least in part to control the heat build up and thus the temperature of the particle bed.

Heat exchange to remove excess heat may be achieved by external heat exchange means, such as, a cooling jacket associated with the reaction vessel or by air cooling the reaction vessel.

Alternatively or additionally, heat exchange also may be achieved by recycling part of the particulate red phosphorus product, after cooling, to mix with the liquid white phosphorus feed to form a slurry for feed to the reaction vessel. The recycled cool red phosphorus particles act as a heat sink and remove the excess heat from the system in generally uniform manner as they heat up.

The particles used in this way are subsequently cooled outside the reaction vessel after removal therefrom and essentially recycle as a dead load. The amount of the product red phosphorus particles used in this way depends on the intended reaction temperature. For example, when the reaction temperature is in the preferred range of about 350° to about 425° C., a slurry of about 40 to 45% w/w red phosphorus in white phosphorus may be used.

The bed of red phosphorus particles in the closed reaction vessel preferably is subjected to continuous agitation to maintain good intermixing of red and white phosphorus and to avoid agglomeration of red phosphorus particles. The agitation also may be accompanied by attrition to maintain small particle sizes in the bed and to break up large agglomerations of particles.

Such agitation and attrition may be achieved in any convenient manner, such as, by using rapidly moving disintegrator blades located within the reaction vessel.

The quantity of phosphorus present in the reaction vessel may be continuously monitored and such monitoring used to control the removal of product red phosphorus from the reaction vessel, especially on an intermittent basis. Thus, when the sensed quantity of phosphorus reaches a predetermined upper value, the removal of product is commenced and continues until the quantity reaches a predetermined lower value.

In order to prevent oxidation of white phosphorus, it is essential to exclude air from the reaction vessel, and the removal of the product is effected under air excluding conditions. It is preferred to utilize a lock hopper in association with the reaction vessel for removal of product.

Unreacted white phosphorus associated with the particulate red phosphorus removed from the reaction zone is removed therefrom and the pure particulate red phosphorus is recovered. The removal of the residual white phosphorus may occur by distillation from the product under the influence of the temperature of the red phosphorus and the atmospheric pressure. An inert gas stream may be used to flush the white phosphorus to a collection zone, for recovery and recycle to the feed to the reaction vessel.

The process of the present invention is beneficial in that the red phosphorus product is recovered directly in particulate substantially pure form. The particle size may be that desired, or the particles may require grinding to decrease the particle size to the desired value. The red phosphorus is usually recovered in the desirable amorphous form. Further, the product may be subjected to classification of particle sizes to remove very small particles, which generally are not desired.

The very small particles may be recycled as at least part of the recycled red phosphorus in the continuous process described above.

The process of the present invention, therefore, provides a process of producing red phosphorus which may be carried out continuously, and does not suffer from the drawbacks of the current commercial batch procedures.

DESCRIPTION OF PREFERRED EMBODIMENT

Figure 1:
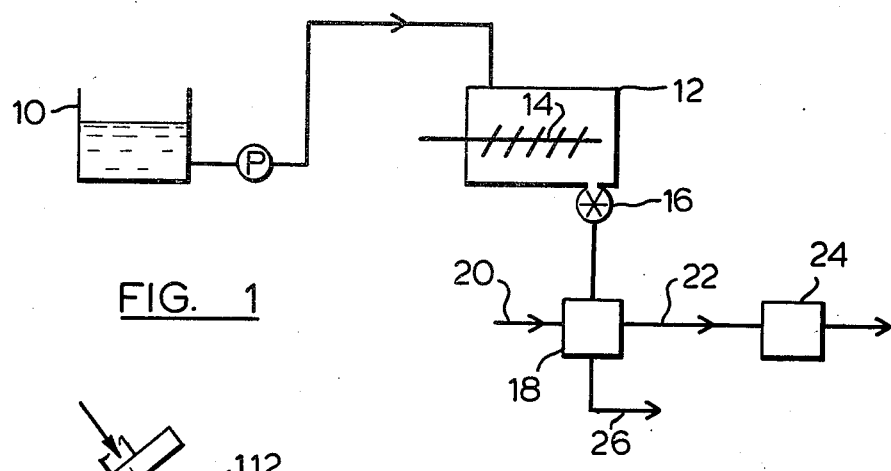
FIG. 1 is a schematic flow sheet of one embodiment of the invention.

Referring to FIG. 1, liquid anhydrous white phosphorus is continuously pumped from a storage vessel 10 into a closed reaction vessel 12 which, at start up, is heated above the conversion temperature, typically above about 250° C. Thereafter, the exothermic conversion provides all the necessary heat and an external cooling jacket may be provided, if desired. A driven agitator 14 is mounted in the reaction vessel 12 for maintaining the mixture of reactant and product in agitation inside the vessel 12.

Product red phosphorus particles together with unreacted white phosphorus are removed from the reaction vessel 12 through a lock hopper 16 into a stripper 18 for removal of residual white phosphorus by distillation. An inert gas is passed by line 20 into the stripper 18 to transport vaporized white phosphorus from the stripper 18 by line 22 to a condensor 24 wherein the stripped white phosphorus is condensed. The particulate red phosphorus product is removed by line 26 for cooling and any desired further processing.

Figure 2:
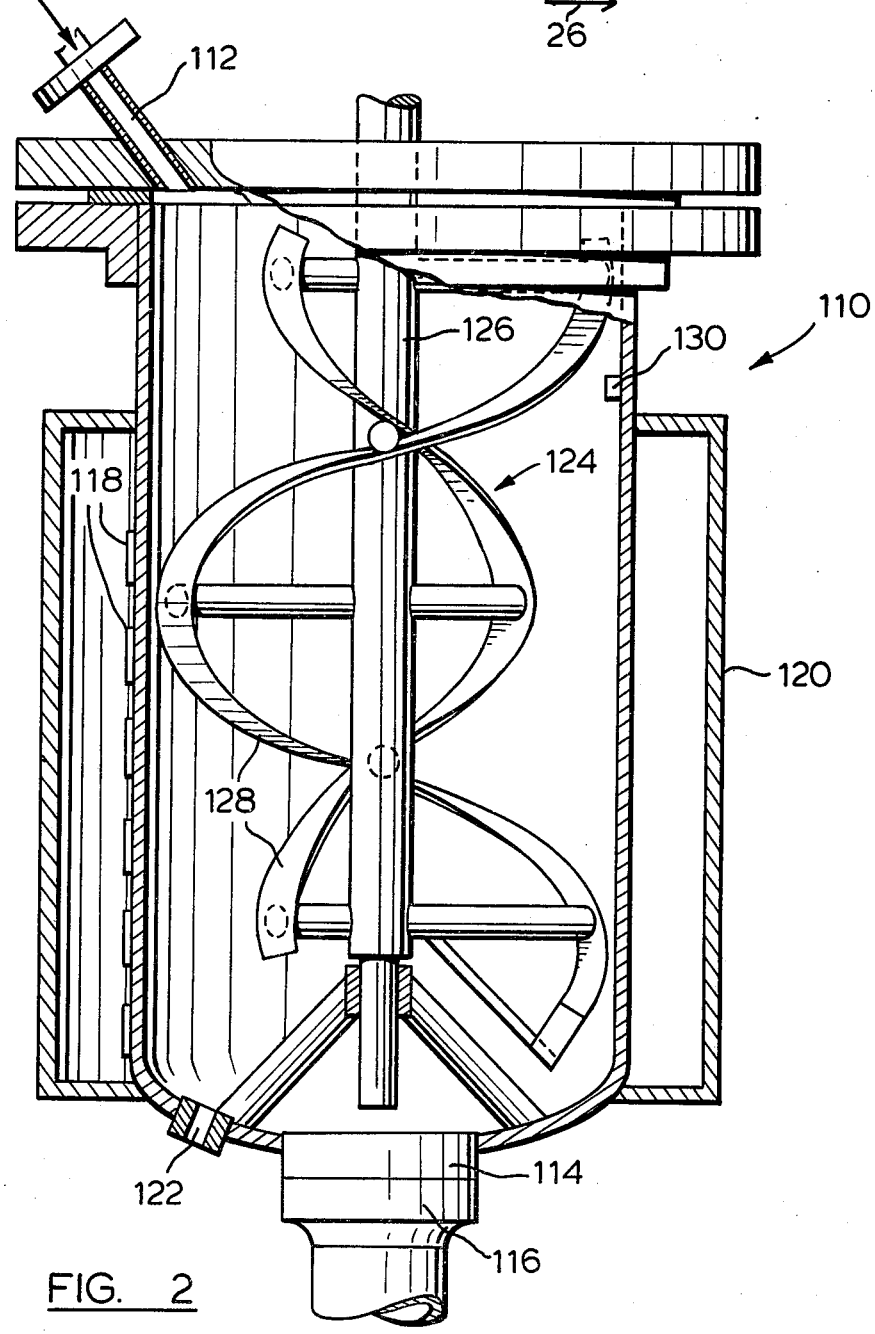
FIG. 2 is a side elevational view of a reactor for use in the procedure of FIG. 1.

Referring to FIG. 2, a cylindrical reactor 110 is oriented with its axis substantially vertical and is provided with a liquid white phosphorus inlet 112 and product outlet 114. The product outlet 114 communicates with a lock hopper 116 the upper portion only of which is shown.

A plurality of heaters 118 are provided externally of the reactor 110 to heat the red phosphorus particle bed to the reaction temperature. A cylindrical cooling jacket 120 surrounds the reactor 110 and cooling air is passed therethrough.

A temperature probe entry port 122 is provided for continuous monitoring of the temperature of the red phosphorus particle bed during the process, in order to control the other operating parameters of the process.

A double helical blade mixer-agitator 124 is mounted within the reactor 110 to agitate the red phosphorus particle bed. The agitator 124 consists of an axle 126 axially positioned in the reactor 110 and driven by an external motor (not shown) and a pair of helical blades 128 mounted on the axle 126.

A level sensor device 130 is mounted in the reactor 110 to sense the quantity of phosphorus in the agitated bed and to cause opening of the product outlet 114 when the quantity reaches a predetermined upper limit and to cause closure of the product outlet 114 when the quantity reaches a predetermined lower limit.

SUMMARY

The present invention, therefore, provides a method of producing particulate red phosphorus by thermal conversion of white phosphorus while controlling the temperature generated by the exotherm. Modifications are possible within the scope of the invention.

What I claim is:

1. A continuous process for the production of red phosphorus, which comprises continuously injecting liquid white phosphorus onto a continuously agitated bed of red phosphorus particles located in a closed reaction vessel, continuously controlling the temperature of said particle bed within the range of about 300° to about 595° C. at least in part by controlling the rate of said continuous injection feed so that the concentration of white phosphorus in the bed is less than about 20% by weight, removing red phosphorus particles from said reaction vessel on an intermittent or continuous basis to control the quantity of phosphorus in said reaction vessel, and separating residual unreacted white phosphorus from said removed red phosphorus particles.

2. The process of claim 1 wherein said particle bed temperature is controlled within the range of about 350° to about 425° C.

3. The process of claim 1 including subjecting said reaction vessel to heat exchange to remove generated heat and augment said continuous temperature control.

4. The process of claim 1 including continuously sensing the quantity of phosphorus present in said bed, actuating reaction vessel opening in response to a predetermined upper limit of phosphorus quantity and actuating reaction vessel closing in response to a predetermined lower limit of phosphorus quantity, thereby to achieve said intermittent red phosphorus particle removal.

* * * * *